US008378043B2

(12) United States Patent
Graham et al.

(10) Patent No.: US 8,378,043 B2
(45) Date of Patent: Feb. 19, 2013

(54) ETHYLENE ALPHA OLEFIN COPOLYMERS AND POLYMERIZATION PROCESSES FOR MAKING THE SAME

(75) Inventors: Blair Alfred Graham, Bright's Grove (CA); Mark P. Ossowski, Bridgewater, NJ (US); James M. Farley, League City, TX (US); Rainer Kolb, Kingwood, TX (US)

(73) Assignee: Univation Technologies, LLC, Houston, TX (US)

(*) Notice: Subject to any disclaimer, the term of this patent is extended or adjusted under 35 U.S.C. 154(b) by 118 days.

(21) Appl. No.: 12/968,996

(22) Filed: Dec. 15, 2010

(65) Prior Publication Data
US 2011/0086990 A1 Apr. 14, 2011

Related U.S. Application Data

(62) Division of application No. 11/821,696, filed on Jun. 25, 2007, now Pat. No. 7,875,690.

(60) Provisional application No. 60/816,840, filed on Jun. 27, 2006, provisional application No. 60/858,825, filed on Nov. 14, 2006.

(51) Int. Cl.
*C08F 4/76* (2006.01)
*C08F 4/64* (2006.01)
*C08F 4/52* (2006.01)
*C08F 210/02* (2006.01)
*C08F 210/00* (2006.01)

(52) U.S. Cl. ........ 526/170; 526/160; 526/348; 526/943; 526/941

(58) Field of Classification Search ............ 526/160, 526/170, 943, 941, 348
See application file for complete search history.

(56) References Cited

U.S. PATENT DOCUMENTS

| 4,933,149 | A | 6/1990 | Rhee et al. |
| 5,436,304 | A | 7/1995 | Griffin et al. |
| 6,143,854 | A | 11/2000 | Bamberger et al. |
| 6,339,134 | B1 | 1/2002 | Crowther et al. |
| 6,448,341 | B1 | 9/2002 | Kolthammer et al. |
| 6,608,149 | B2 | 8/2003 | Mawson et al. |
| 6,831,140 | B2 | 12/2004 | Muhle et al. |
| 6,914,027 | B2 | 7/2005 | Patrick et al. |
| 6,936,675 | B2 | 8/2005 | Szul et al. |
| 6,987,152 | B1 | 1/2006 | Eisinger et al. |
| 7,078,467 | B1 * | 7/2006 | Kolb et al. ............ 526/88 |
| 7,875,690 | B2 | 1/2011 | Graham et al. |
| 8,067,518 | B2 * | 11/2011 | Davey et al. ............ 526/348 |
| 2003/0194575 | A1 | 10/2003 | Tau et al. |
| 2005/0054791 | A1 | 3/2005 | Nowlin et al. |
| 2005/0058847 | A1 | 3/2005 | Szul et al. |
| 2005/0124487 | A1 | 6/2005 | Agapiou et al. |
| 2005/0137364 | A1 | 6/2005 | Cai et al. |
| 2005/0288443 | A1 | 12/2005 | Mavridis et al. |
| 2008/0021183 | A1 | 1/2008 | Graham et al. |
| 2008/0045663 | A1 | 2/2008 | Kolb et al. |
| 2008/0045679 | A1 * | 2/2008 | Davey et al. ............ 526/183 |
| 2011/0040041 | A1 | 2/2011 | Kolb et al. |

FOREIGN PATENT DOCUMENTS

| EP | 0342032 | 10/1994 |
| EP | 1300240 | 4/2003 |
| EP | 1416001 | 5/2004 |
| EP | 1153948 | 11/2004 |
| WO | WO96/00245 | 1/1996 |
| WO | WO 97/03139 | 1/1997 |
| WO | WO99/29737 | 6/1999 |
| WO | WO03/008468 | 1/2003 |
| WO | WO03/093332 | 11/2003 |
| WO | WO04/000919 | 12/2003 |
| WO | WO2006/001588 | 1/2006 |
| WO | WO2006/120418 | 11/2006 |

OTHER PUBLICATIONS

Davey et al., Paper given at presentation "*Engineered Catalyst for Controlled Bimodal Structures in UNIPOL Single Reactor Gas Phase Polyethylene.*" (Feb. 25-27, 2002), Houston, TX.
Davey et al., Slides at presentation "*Engineered Catalyst for Controlled Bimodal Structures in UNIPOL Single Reactor Gas Phase Polyethylene.*" (Feb. 25-27, 2002), Houston, TX.
Davey et al., Paper given at presentation "*Univation Technology's Advanced Catalysts for BOCD LLDPE Beyond Conventional Structure-Property Concepts.*" pp. 1-25 (May 13, 2004), Houston, TX.
Davey et al., Slides at presentation "*Univation Technologies' Advanced Catalysts for BOCD LLDPE Beyond Conventional Structure-Property Concepts.*" (May 13, 2004), Houston, TX.
Farley, Published article "*Metallocene-Catalyzed Polyethylenes for the Global LLDPE Market.*" SPE Conference (Feb. 2005).
Farley et al., Slides at presentation "*Metallocene-Catalyzed Polyethylenes for the Global LLDPE Markets.*" (2005), Houston, TX.

* cited by examiner

*Primary Examiner* — Rip A. Lee
(74) *Attorney, Agent, or Firm* — Kristina Leavitt; Jennifer A. Schmidt

(57) ABSTRACT

A process for the production of an ethylene alpha-olefin copolymer is disclosed. The process includes polymerizing ethylene and at least one alpha-olefin by contacting the ethylene and the at least one alpha-olefin with a metallocene catalyst in at least one gas phase reactor at a reactor pressure of from 0.7 to 70 bar and a reactor temperature of from 20° C. to 150° C. to form an ethylene alpha-olefin copolymer. The resulting ethylene alpha-olefin copolymer may have a density of 0.927 g/cc or greater and environmental stress crack resistance (ESCR) of 500 hr or more when measured according to ASTM 1693/B in 10% Igepal.

9 Claims, 7 Drawing Sheets

ETHYLENE ALPHA OLEFIN COPOLYMERS AND POLYMERIZATION PROCESSES FOR MAKING THE SAME

CROSS REFERENCE TO RELATED APPLICATIONS

This application is a divisional of U.S. Ser. No. 11/821,696, now allowed, which claims the benefit of Application Nos. 60/816,840, filed Jun. 27, 2006, and 60/858,825, filed Nov. 14, 2006, the disclosures of which are herein incorporated in their entireties.

FIELD OF THE INVENTION

The invention relates generally to ethylene alpha olefin copolymers having densities of about 0.927 g/cm³ or higher and processes for making the same.

BACKGROUND OF THE INVENTION

The composition distribution of an ethylene alpha-olefin copolymer refers to the distribution of comonomer (short chain branches) among the molecules that comprise the polyethylene polymer. When the amount of short chain branches varies among the polyethylene molecules, the resin is said to have a "broad" composition distribution. When the amount of comonomer per 1000 carbons is similar among the polyethylene molecules of different chain lengths, the composition distribution is said to be "narrow".

The composition distribution is known to influence the properties of copolymers, for example, extractables content, environmental stress crack resistance, heat sealing, and tear strength. The composition distribution of a polyolefin may be readily measured by methods known in the art, for example, Temperature Raising Elution Fractionation (TREF) or Crystallization Analysis Fractionation (CRYSTAF).

Ethylene alpha-olefin copolymers are typically produced in a low pressure reactor, utilizing, for example, solution, slurry, or gas phase polymerization processes. Polymerization takes place in the presence of catalyst systems such as those employing, for example, a Ziegler-Natta catalyst, a chromium based catalyst, a metallocene catalyst, or combinations thereof.

It is generally known in the art that a polyolefin's composition distribution is largely dictated by the type of catalyst used and typically invariable for a given catalyst system. Ziegler-Natta catalysts and chromium based catalysts produce resins with broad composition distributions (BCD), whereas metallocene catalysts normally produce resins with narrow composition distributions (NCD).

Resins having a Broad Orthogonal Composition Distribution (BOCD) in which the comonomer is incorporated predominantly in the high molecular weight chains can lead to improved physical properties, for example toughness properties and Environmental Stress Crack Resistance (ESCR).

Because of the improved physical properties of resins with orthogonal composition distributions needed for commercially desirable products, there exists a need for medium and high density polyethylenes having an orthogonal composition distribution.

SUMMARY OF THE INVENTION

In one aspect, the present invention relates to a process for the production of an ethylene alpha-olefin copolymer. The process may include polymerizing ethylene and at least one alpha-olefin by contacting the ethylene and the at least one alpha-olefin with a metallocene catalyst in at least one gas phase reactor at a reactor pressure of between 0.7 and 70 bar and a reactor temperature of between 20° C. and 150° C. to form an ethylene alpha-olefin copolymer. The resulting ethylene alpha-olefin copolymer may have a density of 0.927 g/cc or higher, a melt index ($I_2$) of between 0.1 and 100 dg/min, a melt index ratio of $I_{21}/I_2$ between and 40, an ESCR value of 500 hr or greater when measured according to ASTM 1693/B in 10% Igepal, and an orthogonal composition distribution evidenced by a $M_{60}/M_{90}$ value of greater than 1, wherein $M_{60}$ is the molecular weight of the polymer fraction that elutes at 60° C. and $M_{90}$ is the molecular weight of the polymer fraction that elutes at 90° C. in a TREF-LS experiment.

In another aspect, the present invention relates to a process for the production of an ethylene alpha-olefin copolymer having a broad composition distribution. The process may include polymerizing ethylene and at least one alpha-olefin by contacting the ethylene and the at least one alpha-olefin with a metallocene catalyst in at least one gas phase reactor at a reactor pressure of between 0.7 and 70 bar and a reactor temperature of between 20° C. and 150° C. to form an ethylene alpha-olefin copolymer. The resulting ethylene alpha-olefin copolymer may have a density of 0.927 g/cc or higher, a melt index ($I_2$) of between 0.1 and 100 dg/min, a melt index ratio of $I_{21}/I_2$ between 15 and 40, and a broad composition distribution evidenced by a $T_{75}$-$T_{25}$ value of greater than 15 wherein $T_{25}$ is the temperature at which 25% of the eluted polymer is obtained and $T_{75}$ is the temperature at which 75% of the eluted polymer is obtained in a TREF experiment.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

Embodiments of this invention relate to the production of ethylene alpha-olefin copolymers as well as improvements in the properties of the resulting ethylene alpha-olefin copolymer.

In other embodiments, the invention relates to metallocene catalysts and polymerization processes for producing a metallocene polyethylene having a density of 0.927 g/cc or higher with an orthogonal composition distribution.

In other aspects, embodiments disclosed herein relate to an ethylene alpha-olefin copolymer having a density of 0.927 g/cc or higher with a broad composition distribution.

Composition Distribution

Figure 7:
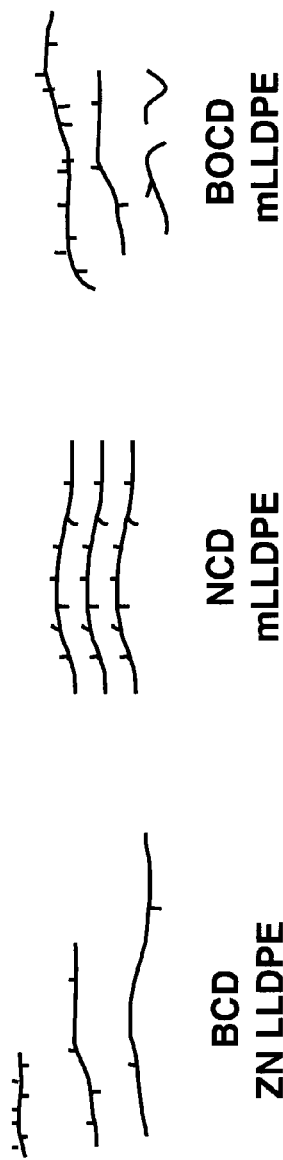
FIG. 7 is a schematic representation of the variations of composition distribution.

The composition distribution of an ethylene alpha-olefin copolymer refers to the distribution of comonomer (short chain branches) among the molecules that comprise the polyethylene polymer. Ziegler-Natta catalysts and chromium based catalysts produce resins with Broad Composition Distributions (BCD). These Ziegler-Natta and chromium based BCD resins are further characterized by a "conventional comonomer incorporation". What is meant by "conventional comonomer incorporation" is that the comonomer is incorporated predominantly in the low molecular weight chains. FIG. 7 is provided to further illustrate the concepts presented in this section.

Certain metallocene catalysts are capable of producing resins with narrow composition distributions (NCD), in which the comonomer content is about uniform among the polymer chains of different molecular weights.

BOCD refers to a Broad Orthogonal Composition Distribution in which the comonomer is incorporated predominantly in the high molecular weight chains. The distribution of the short chain branches can be measured, for example, using Temperature Raising Elution Fractionation (TREF) in connection with a Light Scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights.

Certain advantages of a broad orthogonal composition distribution (BOCD) for improved physical properties and low extractables content are disclosed in, for example, U.S. Pat. No. 5,382,630.

The TREF-LS data reported herein were measured using an analytical size TREF instrument (Polymerchar, Spain), with a column of the following dimension: inner diameter (ID) 7.8 mm and outer diameter (OD) 9.53 mm and a column length of 150 mm. The column was filled with steel beads. 0.5 mL of a 6.4% (w/v) polymer solution in orthodichlorobenzene (ODCB) containing 6 g BHT/4 L were charged onto a the column and cooled from 140° C. to 25° C. at a constant cooling rate of 1.0° C./min. Subsequently, ODCB was pumped through the column at a flow rate of 1.0 ml/min, and the column temperature was increased at a constant heating rate of 2° C./min to elute the polymer. The polymer concentration in the eluted liquid was detected by means of measuring the absorption at a wavenumber of 2857 cm$^{-1}$ using an infrared detector. The concentration of the ethylene-α-olefin copolymer in the eluted liquid was calculated from the absorption and plotted as a function of temperature. The molecular weight of the ethylene-α-olefin copolymer in the eluted liquid was measured by light scattering using a Minidawn Tristar light scattering detector (Wyatt, Calif., USA). The molecular weight was also plotted as a function of temperature.

The breadth of the composition distribution is characterized by the $T_{75}$-$T_{25}$ value, wherein $T_{25}$ is the temperature at which 25% of the eluted polymer is obtained and $T_{75}$ is the temperature at which 75% of the eluted polymer is obtained in a TREF experiment as described herein. The composition distribution is further characterized by the $F_{80}$ value, which is the fraction of polymer molecules that elute below 80° C. in a TREF-LS experiment as described herein. A higher $F_{80}$ value indicates a higher fraction of comonomer in the polymer molecule. An orthogonal composition distribution is defined by a $M_{60}/M_{90}$ value that is greater than 1, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

Metallocene Catalyst Compounds

The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving groups bound to the at least one metal atom. Hereinafter, these compounds will be referred to as "metallocenes" or "metallocene catalyst components". The metallocene catalyst component may be supported on a support material, as described further below, and may be supported with or without another catalyst component. In one embodiment, the one or more metallocene catalyst components of the invention are represented by the formula (I):

$$Cp^A Cp^B MX_n \qquad (I)$$

wherein M is a metal atom selected from the group consisting of Groups 3 through 12 atoms and lanthanide Group atoms in one embodiment. In other embodiments, M may be selected from Ti, Zr, Hf atoms. In yet other embodiments, M is hafnium (Hf). Each leaving group X is chemically bonded to M; each Cp group is chemically bonded to M; and n is 0 or an integer from 1 to 4, and either 1 or 2 in a particular embodiment.

The Cp ligands are one or more rings or ring systems, at least a portion of which includes π-bonded systems, such as cycloalkadienyl ligands and heterocyclic analogues. The Cp ligands are distinct from the leaving groups bound to the catalyst compound in that they are not highly susceptible to substitution or abstraction reactions. The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by at least one R group. Non-limiting examples of substituent R groups include groups selected from hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In one embodiment, $Cp^A$ and $Cp^B$ are independently selected from the group consisting of cyclopentadienyl, indenyl, tetrahydroindenyl, fluorenyl, and substituted derivatives of each. (As used herein, the term "substituted" means that the group following that term possesses at least one moiety in place of one or more hydrogens in any position, which moieties are selected from such groups as halogen radicals (e.g., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls include, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof).

In one embodiment, each leaving group X in the formula (I) above may be independently selected from the group consisting of halogen ions, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons, and substituted derivatives thereof. As used herein, the phrase "leaving group" refers to one or more chemical moieties bound to the metal center of the catalyst component, which can be abstracted from the catalyst component by an activator, thus producing a species active towards olefin polymerization or oligomerization. The activator is described further below.

The structure of the metallocene catalyst component may take on many forms, such as those disclosed in, for example, U.S. Pat. Nos. 5,026,798, 5,703,187, and 5,747,406, including a dimer or oligomeric structure, such as disclosed in, for example, U.S. Pat. Nos. 5,026,798 and 6,069,213. Others include those catalysts describe in published U.S. Pat. App. Nos. US2005/0124487A1, US2005/0164875A1, and US2005/0148744. In other embodiments, the metallocene may be formed with a hafnium metal atom, such as is described in U.S. Pat. No. 6,242,545.

In certain embodiments, the metallocene catalysts components described above may include their structural or optical or enantiomeric isomers (racemic mixture), and, in one embodiment, may be a pure enantiomer. As used herein, a single, bridged, asymmetrically substituted metallocene catalyst component having a racemic and/or meso isomer does not, itself, constitute at least two different bridged, metallocene catalyst components.

In one embodiment, the metallocene catalyst contains hafnium as the metal atom. In other embodiments, at least one of the ligands (pi-bonded moieties) contains a cyclopentadienyl group. In other embodiments, the metallocene contains a chloride leaving group. In yet other embodiments, the metallocene contains a fluoride leaving group. In yet other embodiments, the metallocene contains a methyl leaving group.

In some embodiments, the metallocene catalyst may be a bis(n-propylcyclopentadienyl)hafnium $X_n$, bis(n-butylcyclopentadienyl)hafnium $X_n$, bis(n-pentylcyclopentadienyl) hafnium $X_n$, (n-propyl cyclopentadienyl)(n-butylcyclopentadienyl)hafnium $X_n$, bis[(2-trimethylsilylethyl) cyclopentadienyl]hafnium $X_n$, bis(trimethylsilyl cyclopentadienyl)hafnium $X_n$, dimethylsilylbis(n-propylcyclopentadienyl)hafnium $X_n$, dimethylsilylbis(n-butylcyclopentadienyl)hafnium $X_n$, bis(1-n-propyl-2-methylcyclopentadienyl)hafnium $X_n$, (n-propylcyclopentadienyl)(1-n-propyl-3-n-butylcyclopentadienyl)hafnium $X_n$, or combinations thereof, where $X_n$ is as described above.

In other embodiments, the metallocene catalyst may be a bis(n-propylcyclopentadienyl)hafnium dichloride, a bis(n-propylcyclopentadienyl)hafnium difluoride, or a dimethyl bis (n-propylcyclopentadienyl)hafnium.

Activator and Activation Methods for the Metallocene Catalyst Compounds

The term "activator" is defined to be any compound or component which can activate a transition metal metallocene-type catalyst compound as described above, for example, a Lewis acid or a non-coordinating ionic activator or ionizing activator or any other compound that can convert a neutral metallocene catalyst component to a metallocene cation. It is within the scope of this invention to use alumoxane or modified alumoxane as an activator, and/or to also use ionizing activators, neutral or ionic, such as tri (n-butyl) ammonium tetrakis(pentafluorophenyl) boron or a trisperfluorophenyl boron metalloid precursor which ionize the neutral metallocene compound. A preferred activator used with the catalyst compositions of the present invention is methylaluminoxane ("MAO"). The MAO activator may be associated with or bound to a support, either in association with the catalyst component (e.g., metallocene) or separate from the catalyst component, such as described by Gregory G. Hlatky, Heterogeneous Single-Site Catalysts for Olefin Polymerization, 100 (4) CHEMICAL REVIEWS 1347-1374 (2000).

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838 and European publications EP-A-0 561 476, EP-B1-0 279 586 and EP-A-0 594-218, and PCT publication WO 94/10180.

Ionizing compounds may contain an active proton, or some other cation associated with but not coordinated or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198, 401, 5,066,741, 5,206,197, 5,241,025, 5,387,568, 5,384,299 and 5,502,124. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410.

Method for Supporting

A support may also be present as part of the catalyst system of the present invention. Supports, methods of supporting, modifying, and activating supports for single-site catalyst such as metallocenes are discussed in, for example, 1 METALLOCENE-BASED POLYOLEFINS 173-218 (J. Scheirs & W. Kaminsky eds., John Wiley & Sons, Ltd. 2000). The terms "support" or "carrier," as used herein, are used interchangeably and refer to any support material, including inorganic or organic support materials. In one embodiment, the support material may be a porous support material. Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gel, and polymers such as polyvinylchloride and substituted polystyrene, functionalized or crosslinked organic supports such as polystyrene divinyl benzene polyolefins or polymeric compounds, and mixtures thereof, and graphite, in any of its various forms.

Desirable carriers are inorganic oxides that include Group 2, 3, 4, 5, 13 and 14 oxides and chlorides. Support materials include silica, alumina, silica-alumina, magnesium chloride, graphite, and mixtures thereof in one embodiment. Other useful supports include magnesia, titania, zirconia, montmorillonite (as described in EP0511665B1), phyllosilicate, and the like. In other embodiments, combinations of the support materials may be used, including, but not limited to, combinations such as silica-chromium, silica-alumina, silica-titania, and the like. Additional support materials may include those porous acrylic polymers described in EP0767184B1.

The catalyst system of the invention can be made and used in a variety of different ways. In one embodiment, the catalyst is unsupported, preferably in liquid form such as described in U.S. Pat. Nos. 5,317,036 and 5,693,727 and European publication EP-A-0593083. In the preferred embodiment, the catalyst system of the invention is supported. Examples of supporting the catalyst system used in the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,468,702, 6,090,740 and PCT publications WO 95/32995, WO 95/14044, WO 96/06187, and WO 97/02297.

In another embodiment, the catalyst system of the invention contains a polymer bound ligand as described in U.S. Pat. No. 5,473,202. In one embodiment the catalyst system of the invention is spray dried as described in U.S. Pat. No. 5,648, 310. In an embodiment the support of the invention is functionalized as described in European publication EP-A-0802203 or at least one substituent or leaving group is selected as described in U.S. Pat. No. 5,688,880.

In another embodiment of the invention, the supported catalyst system of the invention includes an antistatic agent or surface modifier, for example, those described in U.S. Pat. No. 5,283,278 and PCT publication WO 96/11960.

A preferred method for producing the catalyst of the invention can be found in WO 96/00245 and WO 96/00243.

Polymerization Process

The polymerization process of the present invention may be carried out using any suitable process, such as, for example, solution, slurry, high pressure, and gas phase. A particularly desirable method for producing polyolefin polymers according to the present invention is a gas phase polymerization process preferably utilizing a fluidized bed reactor. This type reactor, and means for operating the reactor, are described in, for example, U.S. Pat. Nos. 3,709,853; 4,003, 712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421.

In general, the polymerization process may be a continuous gas phase process, such as a fluid bed process. A fluid bed reactor for use in the process of the present invention typically has a reaction zone and a so-called velocity reduction zone. The reaction zone includes a bed of growing polymer particles, formed polymer particles and a minor amount of catalyst particles fluidized by the continuous flow of the gaseous monomer and diluent to remove heat of polymerization through the reaction zone. The gas leaving the reaction zone is passed to the velocity reduction zone where entrained particles are allowed to settle back to the particle bed. Finer entrained particles and dust may be removed in a cyclone and/or fine filter. The gas is passed through a heat exchanger wherein the heat of polymerization is removed, compressed in a compressor and then returned to the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone.

The process of the present invention is suitable for the production of homopolymers of olefins, including ethylene, and/or copolymers, terpolymers, and the like, of olefins, including polymers comprising ethylene and at least one or more other olefins. The olefins may be alpha-olefins, such as propylene, butane, hexene, or mixtures thereof. The olefins, for example, may contain from 2 to 16 carbon atoms in one embodiment; ethylene and a comonomer comprising from 3 to 12 carbon atoms in another embodiment; ethylene and a comonomer comprising from 4 to 10 carbon atoms in another embodiment; and ethylene and a comonomer comprising from 4 to 8 carbon atoms in another embodiment.

Other monomers useful in the process described herein include ethylenically unsaturated monomers, diolefins having 4 to 18 carbon atoms, conjugated or non-conjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene. In another embodiment of the process described herein, ethylene or propylene may be polymerized with at least two different comonomers, optionally one of which may be a diene, to form a terpolymer.

In one embodiment, the content of the alpha-olefin incorporated into the copolymer may be less than 30 mol % in total; less than 20 mol % in other embodiments and less than 10 mol % in yet other embodiments. The term "polyethylene" when used herein is used generically to refer to any or all of the polymers comprising ethylene described above.

Hydrogen gas is often used in olefin polymerization to control the final properties of the polyolefin. Using the catalyst system of the present invention, it is known that increasing the concentration (partial pressure) of hydrogen may increase the melt index ratio and/or melt index (MI) of the polyolefin generated. The MFI or MI can thus be influenced by the hydrogen concentration. The amount of hydrogen in the polymerization can be expressed as a mole ratio relative to the total polymerizable monomer, for example, ethylene, or a blend of ethylene and hexene or propylene. The amount of hydrogen used in the polymerization processes of the present invention is an amount necessary to achieve the desired MFI or MI of the final polyolefin resin.

Further, in certain embodiments, the polymerization process may include two or more reactors. Such commercial polymerization systems are described in, for example, 2 METALLOCENE-BASED POLYOLEFINS 366-378 (John Scheirs & W. Kaminsky, eds. John Wiley & Sons, Ltd. 2000); U.S. Pat. Nos. 5,665,818, 5,677,375, and EP-A-0 794 200.

In one embodiment, the one or more reactors in a gas phase or fluidized bed polymerization process may have a pressure ranging from about 0.7 to about 70 bar (about 10 to 1000 psia); and in another embodiment, a pressure ranging from about 14 to about 42 bar (about 200 to about 600 psia). In one embodiment, the one or more reactors may have a temperature ranging from about 10° C. to about 150° C.; and in another embodiment from about 40° C. to about 125° C. In one embodiment, the reactor temperature may be operated at the highest feasible temperature taking into account the sintering temperature of the polymer within the reactor. In one embodiment, the superficial gas velocity in the one or more reactors may range from about 0.2 to 1.1 meters/second (0.7 to 3.5 feet/second); and from about 0.3 to 0.8 meters/second (1.0 to 2.7 feet/second) in another embodiment.

In another embodiment of the invention, the polymerization process is a continuous gas phase process that includes the steps of: (a) introducing ethylene and at least one other alpha olefin monomer(s) into the reactor; (b) introducing the supported catalyst system; (c) withdrawing a recycle stream from the reactor; (d) cooling the recycle stream; (e) introducing into the reactor additional monomer(s) to replace the monomer(s) polymerized; (f) reintroducing the recycle stream or a portion thereof into the reactor; and (g) withdrawing a polymer product from the reactor.

In embodiments of the invention, one or more olefins, $C_2$ to $C_{30}$ olefins or alpha-olefins, including ethylene or propylene or combinations thereof, may be prepolymerized in the presence of the metallocene catalyst systems described above prior to the main polymerization. The prepolymerization may be carried out batch-wise or continuously in gas, solution or slurry phase, including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371.

The present invention is not limited to any specific type of fluidized or gas phase polymerization reaction and can be carried out in a single reactor or multiple reactors such as two or more reactors in series. In embodiments, the present invention may be carried out in fluidized bed polymerizations (that may be mechanically stirred and/or gas fluidized), or with those utilizing a gas phase, similar to that as described above. In addition to well-known conventional gas phase polymerization processes, it is within the scope of the present invention that "condensing mode", including the "induced condensing mode" and "liquid monomer" operation of a gas phase polymerization may be used.

Embodiments of the present invention may employ a condensing mode polymerization, such as those disclosed in U.S. Pat. Nos. 4,543,399; 4,588,790; 4,994,534; 5,352,749; 5,462,999; and 6,489,408. Condensing mode processes may be used to achieve higher cooling capacities and, hence, higher reactor productivity. In addition to condensable fluids of the polymerization process itself, other condensable fluids inert to the polymerization may be introduced to induce a condensing mode operation, such as by the processes described in U.S. Pat. No. 5,436,304.

Other embodiments of the present invention may also use a liquid monomer polymerization mode such as those disclosed in U.S. Pat. No. 5,453,471; U.S. Ser. No. 08/510,375; PCT 95/09826 (US) and PCT 95/09827 (US). When operating in the liquid monomer mode, liquid can be present throughout the entire polymer bed provided that the liquid monomer present in the bed is adsorbed on or in solid particulate matter present in the bed, such as polymer being produced or inert particulate material (e.g., carbon black, silica, clay, talc, and mixtures thereof), so long as there is no substantial amount of free liquid monomer present. Operating in a liquid monomer mode may also make it possible to produce polymers in a gas phase reactor using monomers having condensation temperatures much higher than the temperatures at which conventional polyolefins are produced.

In one embodiment, a useful polymerization technique may be particle form polymerization or a slurry process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. Nos. 4,613,484 and 2 METALLOCENE-BASED POLYOLEFINS 322-332 (2000).

In one embodiment, a slurry polymerization process generally uses pressures in the range of from 1 to 50 bar and even greater, and temperatures in the range of 0° C. to 120° C. In a slurry polymerization, a suspension of solid, particulate polymer is formed in a liquid polymerization diluent medium to which ethylene and comonomers and often hydrogen along with catalyst are added. The suspension, including diluent, is intermittently or continuously removed from the reactor where the volatile components are separated from the polymer and recycled, optionally after a distillation, to the reactor. The liquid diluent employed in the polymerization medium is typically an alkane having from 3 to 7 carbon atoms; in one embodiment, the alkane may be a branched alkane. The medium employed should be liquid under the conditions of polymerization and relatively inert. When a propane medium is used, the process must be operated above the reaction diluent critical temperature and pressure. In one embodiment, a hexane or an isobutane medium is employed.

In one embodiment of the process of the invention, the slurry or gas phase process may be operated in the presence of a metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc, and the like. By "essentially free" it is meant that these compounds are not deliberately added to the reactor or any reactor components, and if present, are present in the reactor at less than 1 ppm.

As noted above, the polymerization process of the present invention may be carried out by using a solution process. Non-limiting examples of solution processes are described in, for example, U.S. Pat. Nos. 4,271,060, 5,001,205, 5,236,998, and 5,589,555.

In another embodiment, one or all of the catalysts are combined with up to 15 weight percent of a metal-fatty acid compound, such as, for example, an aluminum stearate, based upon the weight of the catalyst system (or its components), such as disclosed in, for example, U.S. Pat. Nos. 6,300,436 and 5,283,278. Other suitable metals include other Group 2 and Group 5-13 metals. In another embodiment, a solution of the metal-fatty acid compound is fed into the reactor. In another embodiment, the metal-fatty acid compound is mixed with the catalyst and fed into the reactor separately. These agents may be mixed with the catalyst or may be fed into the reactor in a solution or slurry with or without the catalyst system or its components.

In some embodiments, for a fluidized bed gas-phase reactor, the reactor temperature of the fluidized bed process may be the highest temperature that is feasible taking into account the sticking temperature of the polyolefin product within the reactor and any fouling that may occur in the reactor or recycle line(s).

Polymer

In a class of embodiments, the polymers disclosed herein may have a melt index (MI) or ($I_2$) as measured by ASTM-D-1238-E (190° C., 2.16 kg weight) in the range from 0.01 dg/min to 1000 dg/min. In other embodiments, the polymer may have a MI from about 0.01 dg/min to about 200 dg/min; from about 0.1 dg/min to about 200 dg/min in other embodiments; and from about 1 dg/min to about 200 dg/min in yet other embodiments.

In any of the embodiments described herein, the polymers disclosed herein may have a melt index ratio (MFR) ($I_{21}/I_2$, where $I_{21}$ is measured by ASTM-D-1238-F, at 190° C., 21.6 kg weight) of from 5 to 300; from about 10 to less than 100 in other embodiments; from 15 to 50 in yet other embodiments; and from 15 to 40 in yet another embodiments.

In any of the embodiments described herein, the polymers described herein may typically have a weight average molecular weight to number average molecular weight ($M_w/M_n$) of greater than 1.5 to about 5, particularly greater than 2 to about 4.0, more preferably greater than about 2.2 to less than 3.5.

Hexane Extractables

In a class of embodiments, the hexane extractables content may be less than 1.75 percent; less than 1.5 percent in other embodiments; less than 1.0 percent in yet other embodiments, and less than 0.5 percent in yet other embodiments. The data reported are measured in accordance with ASTM D-5227

DSC Melting Point

In any of the embodiments described herein, DSC measurements may be made on a Perkin Elmer System 7 Thermal Analysis System. The data reported are from second melting data measured in accordance with ASTM 3418.

ESCR

ESCR is measured according to ASTM D-1693 Condition A (ASTM D-1693/A) and ASTM D-1693 Condition B (ASTM D-1693/B). For each condition, measurements are conducted in 10% and 100% Igepal. In embodiments, the polymers described herein have an ESCR value of 100 hr or greater when measured according to ASTM 1693/B in 10% Igepal. In other embodiments, the polymers described herein have an ESCR value of 250 hr or greater and in yet other embodiments, the polymers described herein have an ESCR value of 500 hr or greater, when measured according to ASTM D-1693/B in 10% Igepal.

In a class of embodiments, it has been found that resins produced with the metallocene catalysts described herein that have a broadened composition distribution characterized by having higher $T_{75}$-$T_{25}$ value and a higher $F_{80}$ fraction possess substantially improved ESCR than comparable grades with narrower composition distribution. The polyethylene grades described herein may have ESCR of greater than 500 hr when measured according to ASTM D-1693/B measured in 100% Igepal. More details about the embodiments will be apparent from the examples below.

Density

In any of the embodiments described herein, the density of the polymers may be 0.927 g/cc or greater. In other embodiments, the density is between 0.927 g/cc and 0.965 g/cc and between 0.935 g/cc and 0.965 g/cc in yet other embodiments. Density is measured in accordance with ASTM D 1505-03.

Melt Index $I_{21}$ is measured in accordance with ASTM-D-1238-F (190° C., 21.6 kg weight).

$I_5$ is measured in accordance with ASTM-D-1238-G (190° C., 5 kg weight).

$I_2$ as measured in accordance with ASTM-D-1238-E (190° C., 2.16 kg weight).

The polyolefins of the present invention may be blended with other polymers and/or additives to form compositions that can then be used in articles of manufacture. Appropriate additives, methods of adding them and methods of blending are known to the skilled artisan.

The polymers produced may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, $BaSO_4$, diatomaceous earth, wax, carbon black, flame retarding additives, low molecular weight resins, hydrocarbon resins, glass beads and the like. The additives may be present in the typically effective amounts well known in the art, such as 0.001 weight % to 10 weight %.

The resultant polyolefin and polyolefin compositions may be further processed by any suitable means such as by calendering, casting, coating, compounding, extrusion, foaming; all forms of molding including compression molding, injection molding, blow molding, rotational molding (rotomolding), and transfer molding; film blowing or casting and all methods of film formation to achieve, for example, uniaxial or biaxial orientation; thermoforming, as well as by lamination, pultrusion, protrusion, draw reduction, spinbonding, melt spinning, melt blowing, and other forms of fiber and nonwoven fabric formation, and combinations thereof. Typical rotomolded articles include large containers for conveying liquids, drums, agricultural tanks, and large parts such as canoes or large playground toys. Typical injection molded articles include, housewares, thin wall containers, and lids for containers.

These and other forms of suitable processing techniques are described in, for example, PLASTICS PROCESSING (Radian Corporation, Noyes Data Corp. 1986).

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

Example 1

Higher ESCR due to broadened orthogonal composition distribution

Polymerization

The ethylene/1-hexene copolymers were produced in accordance with the following general procedure. The catalyst composition comprised the silica supported bis(n-propylcyclopentadienyl)hafnium dimethyl metallocene catalyst with methylaluminoxane, the Al:Hf ratio being from about 80:1 to 130:1, commercially available from Univation Technologies, LLC, Houston, Tex. The catalyst composition was injected dry into a fluidized bed gas phase polymerization reactor. More particularly, polymerization was conducted in a 2590 mm diameter gas-phase fluidized bed reactor operating at approximately 1720 kPa total pressure. The reactor bed weight was approximately 17,000 kg. Fluidizing gas comprising ethylene, hydrogen, 1-hexene and nitrogen was passed through the bed at a velocity of approximately 0.6 m per second. The fluidizing gas exiting the bed entered a resin disengaging zone located at the upper portion of the reactor. The fluidizing gas then entered a recycle loop and passed through a cycle gas compressor and water-cooled heat exchanger. The shell side water temperature was adjusted to maintain the reaction temperature to the specified value. Ethylene, hydrogen, 1-hexene and nitrogen were fed to the cycle gas loop just upstream of the compressor at quantities sufficient to maintain the desired gas concentrations. Table 1 summarizes the gas concentrations and reactor conditions during the polymerizations.

Gas concentrations were measured by an on-line vapor fraction analyzer. Product (polyethylene particles) was withdrawn from the reactor in batch mode into a purging vessel before it was transferred into a product bin. Residual catalyst and activator in the resin was deactivated in the product drum with a wet nitrogen purge. Table 1 summarizes the gas concentrations and reactor conditions during the polymerizations. "$C_6/C_2$ flow ratio ("FR")" is the ratio of the lbs of 1-hexene comonomer feed to the pounds of ethylene feed to the reactor, whereas the $C_6/C_2$ ratio is the ratio of the gas concentration of 1-hexene moles in the cycle gas to the gas concentration of ethylene moles in the cycle gas. The $C_6/C_2$ ratio is obtained from a cycle gas vapor fraction analyzer, whereas the $C_6/C_2$ Flow Ratio comes from some measure of the mass flow. The cycle gas is the gas in the reactor, and is measured from a tap off the recirculating loop around the reactor. The ratios reported in Table 1 are from the gas concentrations in the reactor. The $C_6/C_2$ ratios are running averages. The STY reported in Table 1 is the Space Time Yield, the SGV is the Superficial Gas Velocity, and the APS is the Average Particle Size of the resulting polymer. Table 2 summarizes the resulting polyethylene properties. The comparative resin is a commercial resin (SURPASS™), available from Nova Chemicals.

TABLE 1

Gas phase polymerization of ethylene and 1-hexene with bis-(n-propylcyclopentadienyl) hafnium dimethyl catalyst.

| Parameter | Sample 1 | Sample 2 |
|---|---|---|
| Temp, ° C. | 77 | 77 |
| $C_2$ partial pressure, psia | 234 | 219 |
| Reactor pressure, psig | 250 | 256 |
| SGV, fps | 2.2 | 2.20 |
| Isopentane, mol % | 5.0 | 10.6 |
| $C_6$ mol % | 0.58 | 0.738 |
| $C_6/C_2$ | 0.0065 | 0.0091 |
| $C_6/C_2$ FR (lb/lb) | 0.022 | 0.0369 |
| $H_2$ ppm | 309 | 370 |
| $H_2$ ppm/$C_2$ mol % | 3.51 | 4.58 |
| Dew Point, ° C. | 29.6 | 30.7 |
| STY | 5.4 | 6.82 |
| Productivity, Cat Feeder, g/g | 7283 | 13318 |
| $I_2$, dg/min | 6.03 | 6.50 |
| $I_{21}/I_2$ | 17.26 | 21.1 |
| Density, g/cm³ | 0.9404 | 0.9383 |
| APS, mm | 0.0285 | 0.03 |

TABLE 2

Properties of Samples 1, 2 and the comparative sample 6

| Parameter | Sample 1 | Sample 2 | Comparative Sample (Nova Surpass) |
|---|---|---|---|
| $I_2$ (dg/min) | 6.03 | 6.50 | 5.3 |
| $I_{21}$ (dg/min) | 104.16 | 137.3 | 121.16 |
| MFR ($I_{21}/I_2$) | 17.26 | 21.1 | 23.3 |
| Density (g/cc) | 0.9404 | 0.9383 | 0.939 |
| Mn | 32,673 | 29,498 | 24,207 |
| Mw | 70,731 | 71,989 | 75,772 |
| Mz | 131,887 | 165,927 | 189,993 |
| Mw/Mn | 2.16 | 2.44 | 3.13 |
| DSC Peak Melt Temperature (° C.) | 127.3 | 125.1 | 124.9 |
| $T_{75}$-$T_{25}$ (° C.) | 2.45 | 5.3 | 4.20 |
| $F_{80}$ | 7.4% | 11.75% | 0% |
| $M_{60}/M_{90}$ | 4.6 | 2.89 | N/A Conventional CD |
| Hexane Extractables | — | 0.2 | not measured |
| ESCR (Condition B, 10% Igepal) | 112 hr | >1000 hr | 82 hr |
| ESCR (Condition B, 100% Igepal) | 247 hr | >1000 hr | 575 hr |
| ESCR (Condition A, 10% Igepal) | 12 hr | 35 hr | 11 hr |
| ESCR (Condition A, 100% Igepal) | 94 hr | >1000 hr | 157 hr |

Figure 1:
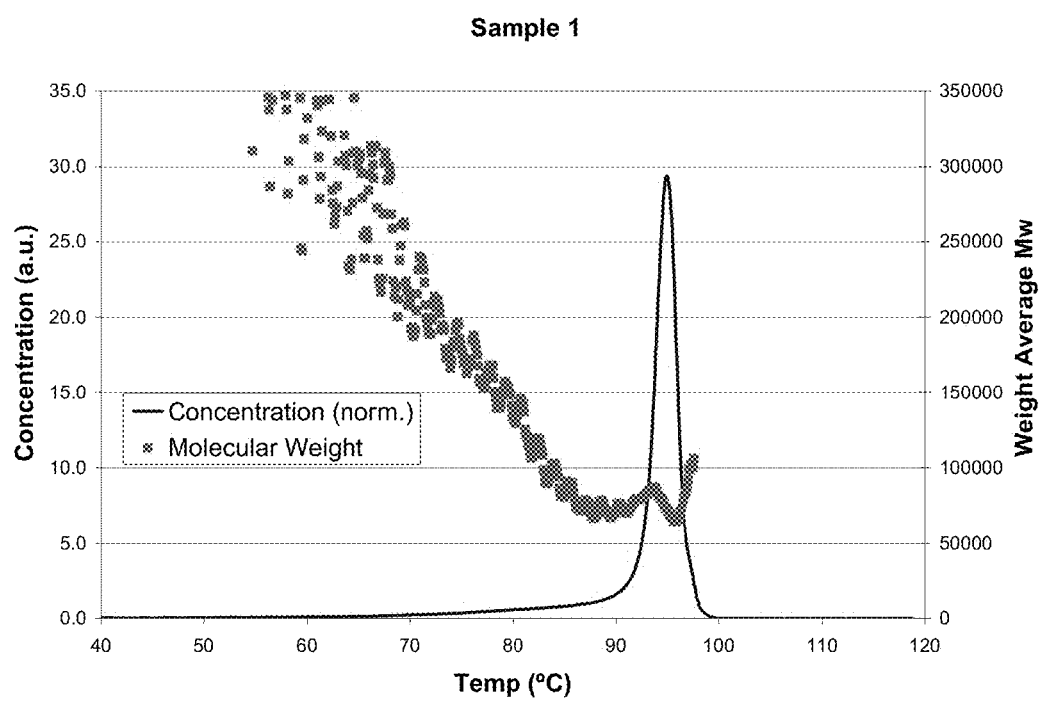
FIG. 1 presents the TREF-LS results obtained for Sample 1.
Figure 2:
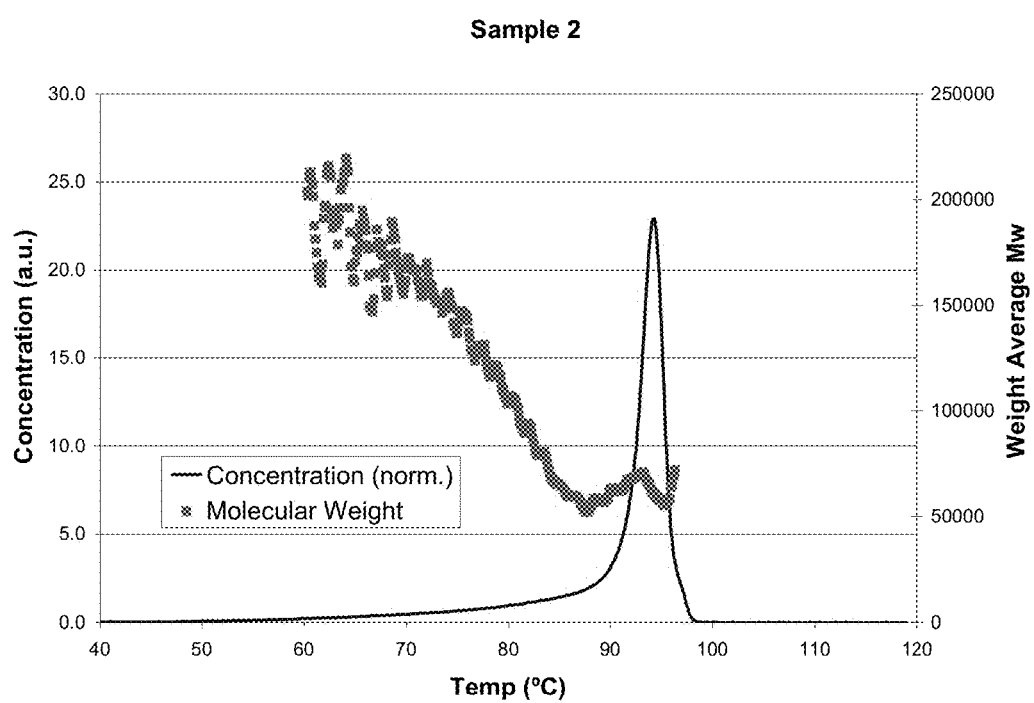
FIG. 2 presents the TREF-LS results obtained for Sample 2.
Figure 3:
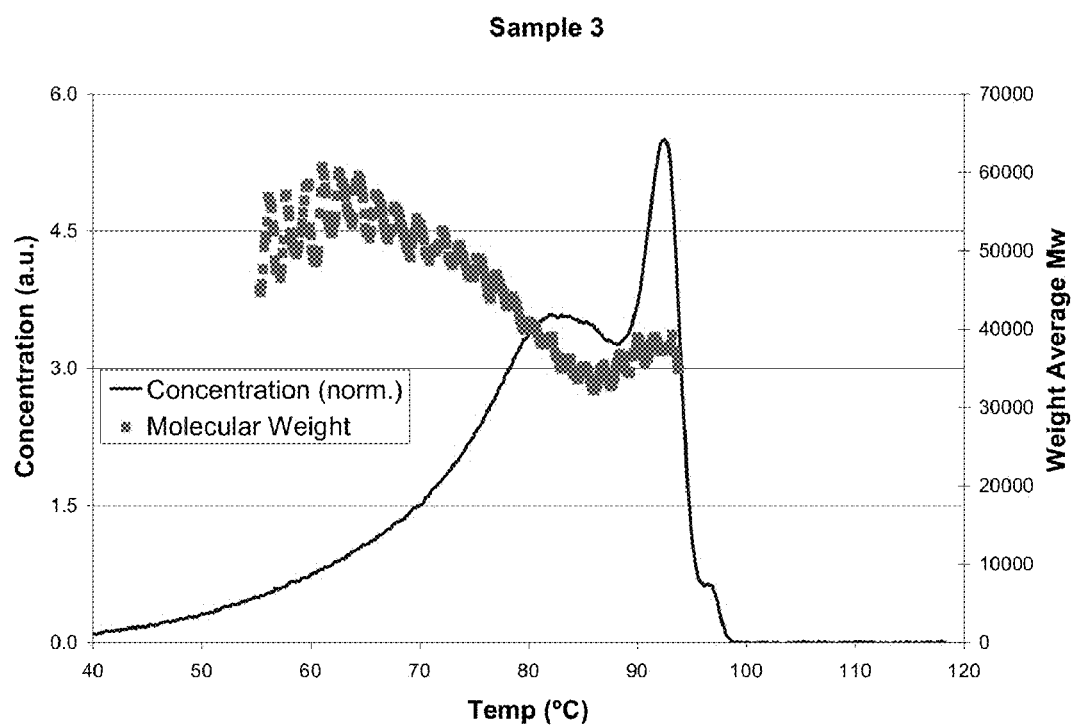
FIG. 3 presents the TREF-LS results obtained for Sample 3.
Figure 4:
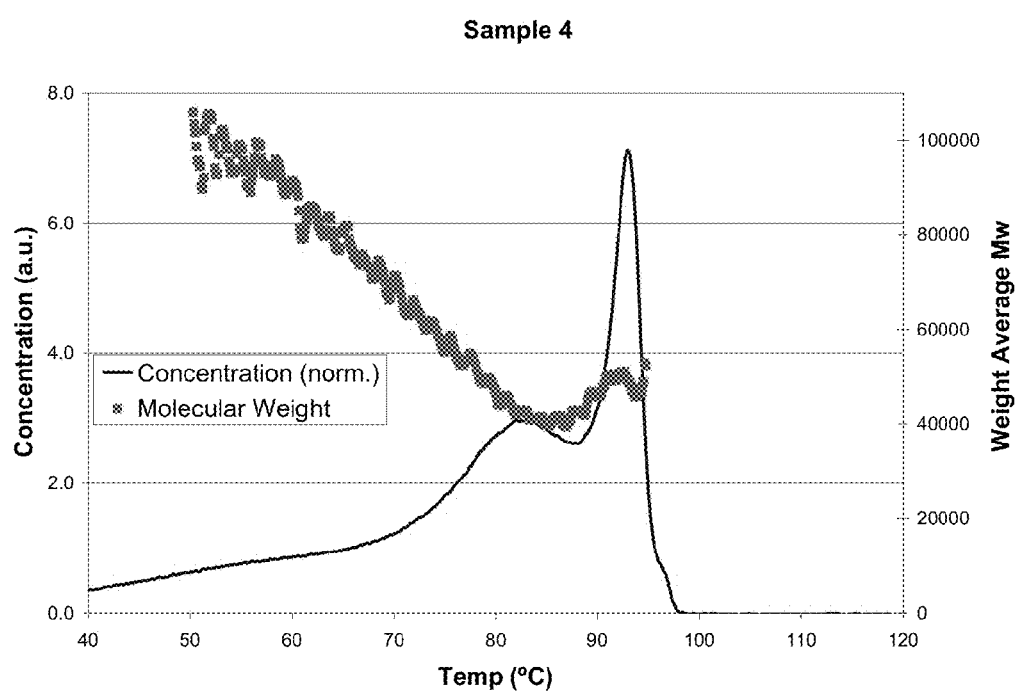
FIG. 4 presents the TREF-LS results obtained for Sample 4.
Figure 5:
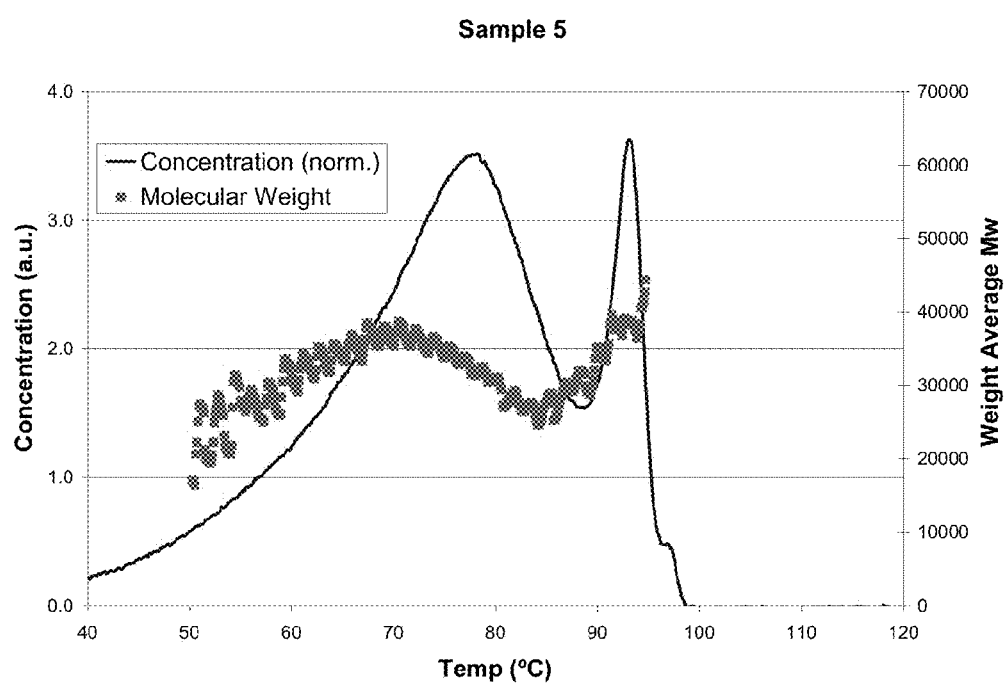
FIG. 5 presents the TREF-LS results obtained for Sample 5.

Both Samples 1 and 2 were produced with embodiments of the metallocene catalyst described herein and have a orthogonal composition distribution as evidenced by the $M_{60}/M_{90}$ value of greater than 2. Sample 2 was produced with a broader composition distribution as evidenced by the higher $T_{75}$-$T_{25}$ value, a higher low temperature fraction as evidenced by the higher $F_{80}$ value both resulting in significantly improved ESCR. The reactor conditions for both resins are given in Table 1. $T_{75}$-$T_{25}$ values, $F_{80}$ values, and ESCR are given in Table 2 along with other properties. TREF-LS data for both samples are given in FIGS. 1 and 2, respectively.

Figure 6:
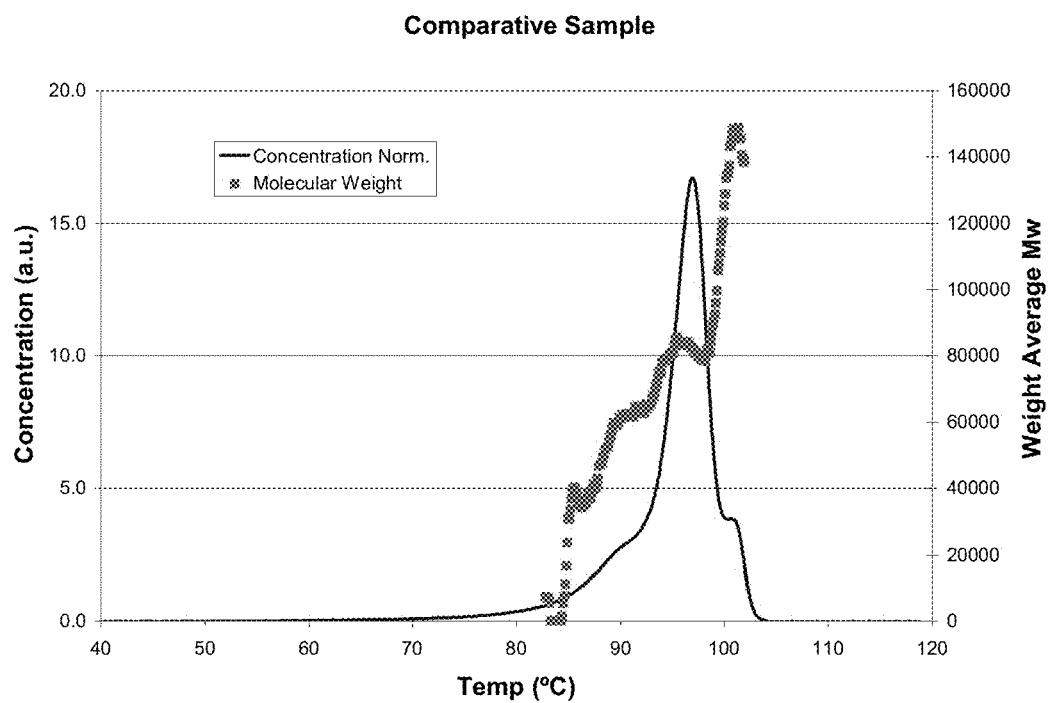
FIG. 6 presents the TREF-LS results obtained for the comparative sample, Sample 6.

A comparative sample (SURPASS™ available from Nova Chemicals) of similar melt index, density and $T_{75}$-$T_{25}$ value to Sample 2 is also shown in Table 2. The comparative sample has a conventional composition distribution and no low temperature fraction. TREF-LS data for the comparative sample is shown in FIG. 6.

While not wishing to be bound by theory, the inventors offer the following explanation for the higher ESCR of Sample 2. It has long been recognized in the art that the presence of high molecular weight chains that contain the majority of the comonomer provide for increased toughness properties, especially ESCR. The high $F_{80}$ value in Sample 2 is evidence for such a fraction with higher comonomer content. These molecules also possess a higher molecular weight than the molecules that elute above 80° C. (i.e. molecules having lower comonomer content) as evidenced by an $M_{60}/M_{90}$ value of greater than 2 shown in the TREF LS data in FIG. 2.

Both the orthogonal nature of the composition distribution and larger fraction of high molecular weight chains with increased comonomer content provide for the improved ESCR of Sample 2 over the comparative sample. The larger fraction of high molecular weight chains with increased comonomer content as evidenced by the higher $F_{80}$ value provide for improved ESCR of Sample 2 over Sample 1.

If the composition distribution was broad but not orthogonal, ESCR may be disadvantageously low. Likewise, if the composition distribution was orthogonal but too narrow, ESCR may be disadvantageously low as well.

Example 2

Resins Having Broad Composition Distributions

Samples 3, 4 and 5 were produced using the same reactor as described in Example 1. The reactor parameters and gas concentrations are listed in Table 3. The polymer properties are listed in Table 4.

TABLE 3

The reactor parameters and gas concentrations for production of samples 3, 4 and 5.

| Parameter | Sample 3 | Sample 4 | Sample 5 |
|---|---|---|---|
| Temp, °C. | 85 | 85 | 85 |
| $C_2$ partial pressure, psia | 235 | 148 | 149 |
| Reactor pressure, psig | 251 | 242 | 241 |
| SGV, fps | 2.1 | 2.15 | 2.09 |
| Isopentane, mol % | 5.0 | 5.0 | 5.0 |
| $C_6$ mol % | 0.89 | 0.523 | 0.687 |
| $C_6/C_2$ | 0.0101 | 0.0091 | 0.0118 |
| $C_6/C_2$ FR (lb/lb) | 0.072 | 0.0595 | 0.1059 |
| $H_2$ ppm | 1416 | 849 | 1481 |
| $H_2$ ppm/$C_2$ mol % | 15.9 | 14.75 | 25.39 |
| Dew Point, °C. | 33.5 | 25.9 | 26.9 |
| STY | 5.3 | 3.8 | 4.99 |
| Productivity, Cat Feeder, g/g | 13,048 | 7303 | 9753 |
| $I_2$, dg/min | 57.8 | 32.67 | 88.77 |
| $I_{21}/I_2$ | 23.9 | 23.73 | 21.4 |
| Density, g/cm³ | 0.932 | 0.9303 | 0.9297 |
| APS, mm | 0.027 | 0.03 | 0.02 |

TABLE 4

Properties of Samples 3, 4 and 5

| Parameter | Sample 3 | Sample 4 | Sample 5 |
|---|---|---|---|
| $I_2$ (dg/min) | 56.7 | 23.5 | 116 |
| $I_{21}$ (dg/min) | 1289 | 643.9 | — |
| MFR ($I_{21}/I_2$) | 22.7 | 27.4 | — |
| Density (g/cc) | 0.9318 | 0.9288 | 0.9293 |
| Mn | 38627 | 16,059 | 11,916 |
| Mw | 12304 | 50,307 | 33,817 |
| Mz |  | 105,090 | 64,062 |
| Mw/Mn | 3.14 | 3.13 | 2.84 |
| DSC Peak Melt Temperature (°C.) | 122.0 | 122.9 | 122.2 |
| $T_{75}$-$T_{25}$ (°C.) | 16.1 | 22.2 | 17.3 |
| $M_{60}/M_{90}$ | 1.33 | 2.00 | 1.1 |
| Hexane Ext | — | 0.8 | 1.5 |

Samples 3, 4 and 5 show a broad composition evidenced by $T_{75}$-$T_{25}$ values of greater than 15. Moreover, Sample 4 shows an orthogonal composition distribution evidenced by a $M_{60}/M_{90}$ values of 2. The Hexane Extractables content of all samples is advantageously low.

Resins described herein having a broad orthogonal composition distribution show an advantageously improved ESCR over comparable commercially available resins, as well as over resins having narrower composition distributions. Advantageously, the present invention provides for a method for the production of a polyethylene having a broad orthogonal composition distribution at densities of 0.927 g/cc or greater.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A process to produce an ethylene alpha-olefin copolymer, the process comprising:
   contacting ethylene and at least one alpha-olefin with a metallocene catalyst in at least one gas phase reactor at a reactor pressure of from 0.7 to 70 bar and a reactor temperature of from 20° C. to 150° C. to form an ethylene alpha-olefin copolymer,
   wherein the ethylene alpha-olefin copolymer satisfies the following conditions:
      a density of 0.927 g/cc or greater,
      a melt index ratio of ($I_{21}/I_2$) of from 15 to 40,
      an ESCR value of 500 hr or greater when measured according to ASTM 1693/B in 10% Igepal,
      a $T_{75}$-$T_{25}$ value of 4 or greater wherein $T_{25}$ is the temperature at which 25% of the eluted polymer is obtained and $T_{75}$ is the temperature at which 75% of the eluted polymer is obtained in a TREF experiment, and
      a $F_{80}$ value of 10% or greater, wherein $F_{80}$ is the fraction of polymer that elutes below 80° C., and
   wherein the metallocene catalyst is selected from the group consisting of:
   bis(n-propylcyclopentadienyl)hafnium $X_n$, bis(n-butylcyclopentadienyl)hafnium $X_n$, bis(n-pentylcyclopentadienyl)hafnium $X_n$, (n-propyl cyclopentadienyl)(n-butylcyclopentadienyl)hafnium $X_n$, bis[(2-trimethylsilylethyl)cyclopentadienyl]hafnium $X_n$, bis(trimethylsilyl cyclopentadienyl)hafnium $X_n$, dimethylsilylbis(n-propylcyclopentadienyl)hafnium $X_n$, dimethylsilylbis(n-butylcyclopentadienyl)hafnium $X_n$, bis(1-n-propyl-2-methylcyclopentadienyl)hafnium $X_n$, and (n-propylcyclopentadienyl)(1-n-propyl-3-n-butylcyclopentadienyl)hafnium $X_n$;

wherein $X_n$ is selected from the consisting of halogen ions, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons and substituted derivatives thereof.

2. The process of claim 1, wherein the ethylene alpha-olefin copolymer has an ESCR value of 1000 hr or greater when measured according to ASTM 1693/B in 10% Igepal.

3. The process of claim 1, wherein said density ranges from 0.927 g/cc to 0.965 g/cc.

4. The process of claim 1, wherein said density ranges from 0.935 g/cc to 0.965 g/cc.

5. The process of claim 1, wherein said density ranges from 0.940 g/cc to 0.965 g/cc.

6. The process of claim 1, wherein said melt index ratio ($I_{21}/I_2$) ranges from 15 to 25.

7. The process of claim 1, wherein the metallocene catalyst is a supported metallocene catalyst.

8. The process of claim 7, wherein the metallocene catalyst is activated with at least one activator selected from the group consisting of an alumoxane, a modified alumoxane, an ionizing compound, and mixtures thereof.

9. The process of claim 8, wherein the activator is an alumoxane.

* * * * *